United States Patent [19]

Traut

[11] 4,364,884
[45] Dec. 21, 1982

[54] METHOD OF MANUFACTURING A RADOME

[75] Inventor: G. Robert Traut, South Killingly, Conn.

[73] Assignee: Rogers Corporation, Rogers, CT

[21] Appl. No.: 149,952

[22] Filed: May 15, 1980

[51] Int. Cl.³ .............................................. C04B 37/00
[52] U.S. Cl. .................................... 264/118; 264/119; 264/122; 264/152; 264/241; 264/248
[58] Field of Search ............... 264/118, 152, 241, 248, 264/122, 119

[56] References Cited

U.S. PATENT DOCUMENTS 3,532,784 10/1970 Vasterling ........................... 264/152
4,096,120 6/1978 Grunke ............................... 264/241

Primary Examiner—James R. Hall
Attorney, Agent, or Firm—Fishman and Van Kirk

[57] ABSTRACT

A radome and the method of manufacture thereof are presented wherein the radome is constructed from a series of rings of fiber reinforced polytetraflouroethylene. The rings are machined from a cold molded PTFE-fiber composite billet and then loaded into a mold cavity. The rings are then subjected to heat and pressure to sinter them together. The resulting structure is machined into its final shape.

9 Claims, 4 Drawing Figures

METHOD OF MANUFACTURING A RADOME

BACKGROUND OF THE INVENTION

This invention is directed to the fabrication of unitary structures, such as missile radomes, from fiber reinforced plastic material. More particularly, this invention relates to radomes which are resistant to ablation and rain erosion, particularly at high operating speeds such as Mach 4 or higher.

Ceramic radomes are typically used for missiles intended to operate at speeds of Mach 4 or higher. These ceramic radomes have been found to be marginal in performance due to fragility, susceptibility to thermal shock, high thermal conductivity, high rates of rain impact damage. A definite need exists for a workable alternative to ceramic radomes.

Radomes made from polymeric composite materials have been suggested as a possible alternative to ceramic radomes. Polytetrafluoroethylene, hereinafter PTFE, is one such polymeric material which might be suitable for radome applications. However, "neat" or simple filled PTFE does not possess the requisite characteristics, uniformity of erosion and ablation for example, for use in the demanding environment of a missile radome. Tests have shown that fiber filled PTFE; i.e., a PTFE composite; would have those characteristics dictated by radome and similar usage.

Prior to the present invention it has been a practical impossibility to fabricate a radome from a PTFE-fiber composite. The production of a solid block of a PTFE composite of sufficient size to permit machining a radome therefrom is not feasible due to the virtual impossibility of heating such a large block through the crystalline melt point and subsequently cooling through the recrystallization point with enough uniformity of temperature to avoid fissures and damage from thermal stress. Further, even if the temperature gradient and thermal stress problems could be avoided, an extremely long heating and cooling cycle (perhaps on the order of several weeks) would be required, and that long cycle time would result in thermal degradation. Other approaches, such as flowing a sheet of PTFE composite material to form a radome shape or laminating a series of rings or discs cut from such sheet material all involve substantial technical or cost problems which have previously precluded the use of such material and techniques.

SUMMARY OF THE INVENTION

The present invention overcomes the above discussed and other problems and provides a large and complex shaped unitary structure formed from a PTFE-fiber composite and suitable for radome use. In accordance with the present invention, discs or rings are molded from a PTFE-fiber composite. The fibers are oriented during molding so as to be predominantly in the direction perpendicular to the axis of the disc and thus, when a radome is to be formed, also perpendicular to the axis of the radome. The discs are then machined to form a series of preforms or segments of desired sizes and shapes. These segments are stacked in a mold with abutting surfaces of adjacent segments arranged generally perpendicular to the wall of the mold at the joints. This perpendicularity is achieved by forming "beveled" faces on the segments. These abutting "beveled" faces prevent radial slippage between segments during subsequent processing steps. The cavity of the mold is shaped to have the general shape of the desired outer surface of the finished radome or other part to be formed. The segments in the mold are then subjected to axial pressure and are sintered in a heating cycle wherein the polymer is taken through the crystalline melt point, heat soaked above the melt point to effect diffusion across the joints and thus to effect thermal bonding across the boundaries of the adjacent rings, slowly cooled to and through the recrystallization point, and then cooled back to room temperature. The bonded structure is then removed from the mold and the inner and outer surfaces are machined to the desired final contour of the radome or other part.

Radomes made in accordance with the present invention are fiber reinforced shapes with the fibers nonisotropically oriented in a preferred direction to reduce the ablation and rain erosion rates and make the ablation and rain erosion more even as compared to "neat" or unfilled PTFE. The product is a fully bonded laminate structure wherein the bonding is effected without any extraneous adhesive or other bonding medium. Also, the end product is relatively economical to produce because the manufacturing process conserves and reduces the amount of material necessary to produce the end product. Also, the end product, although being a laminate, has extremely strong bonding between rings as a result of the manufacturing step wherein the rings are arranged with abutting surfaces perpendicular to the wall of the mold during processing.

Accordingly, one object of the present invention is to provide a novel and improved molded part of fiber reinforced PTFE.

Another object of the present invention is to provide a novel and improved radome structure and method of manufacture thereof.

Still another object of the present invention is to provide a novel and improved radome structure and method of manufacture thereof wherein the radome is formed of a PTFE-fiber composite.

Other objects and advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
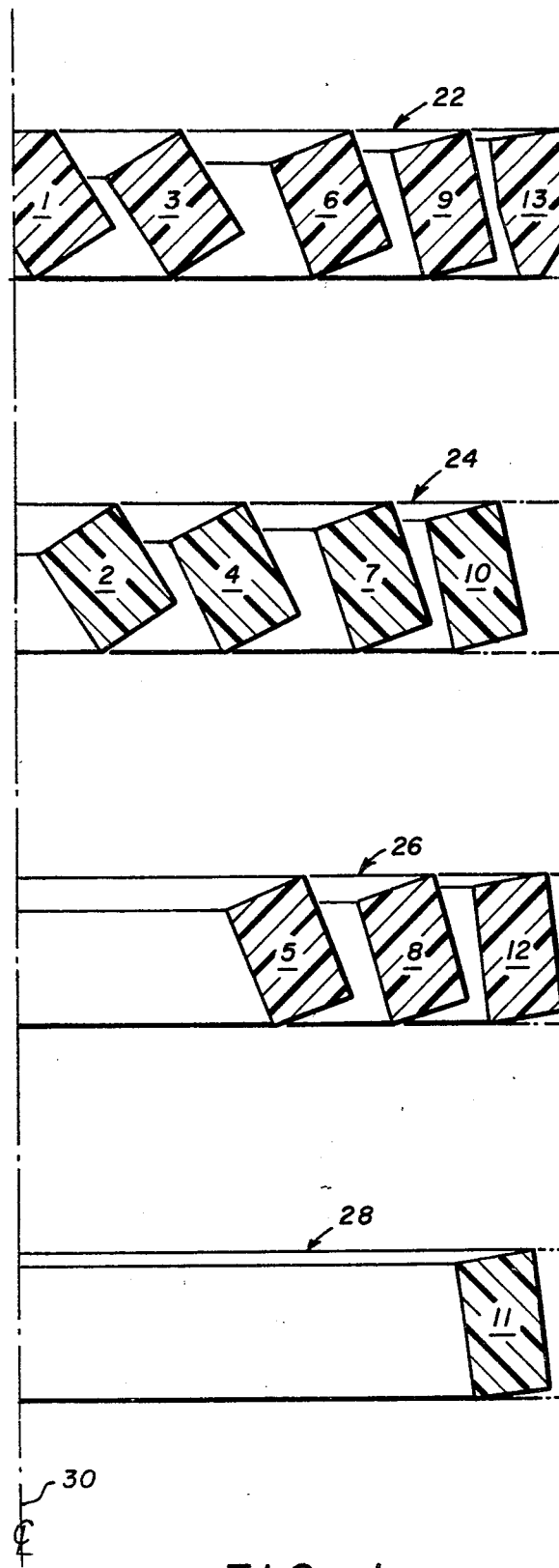
FIG. 1 schematically shows a series of molded PTFE-fiber composite discs and, in cross-section preform segment shapes which will be formed therefrom.
Figure 2:
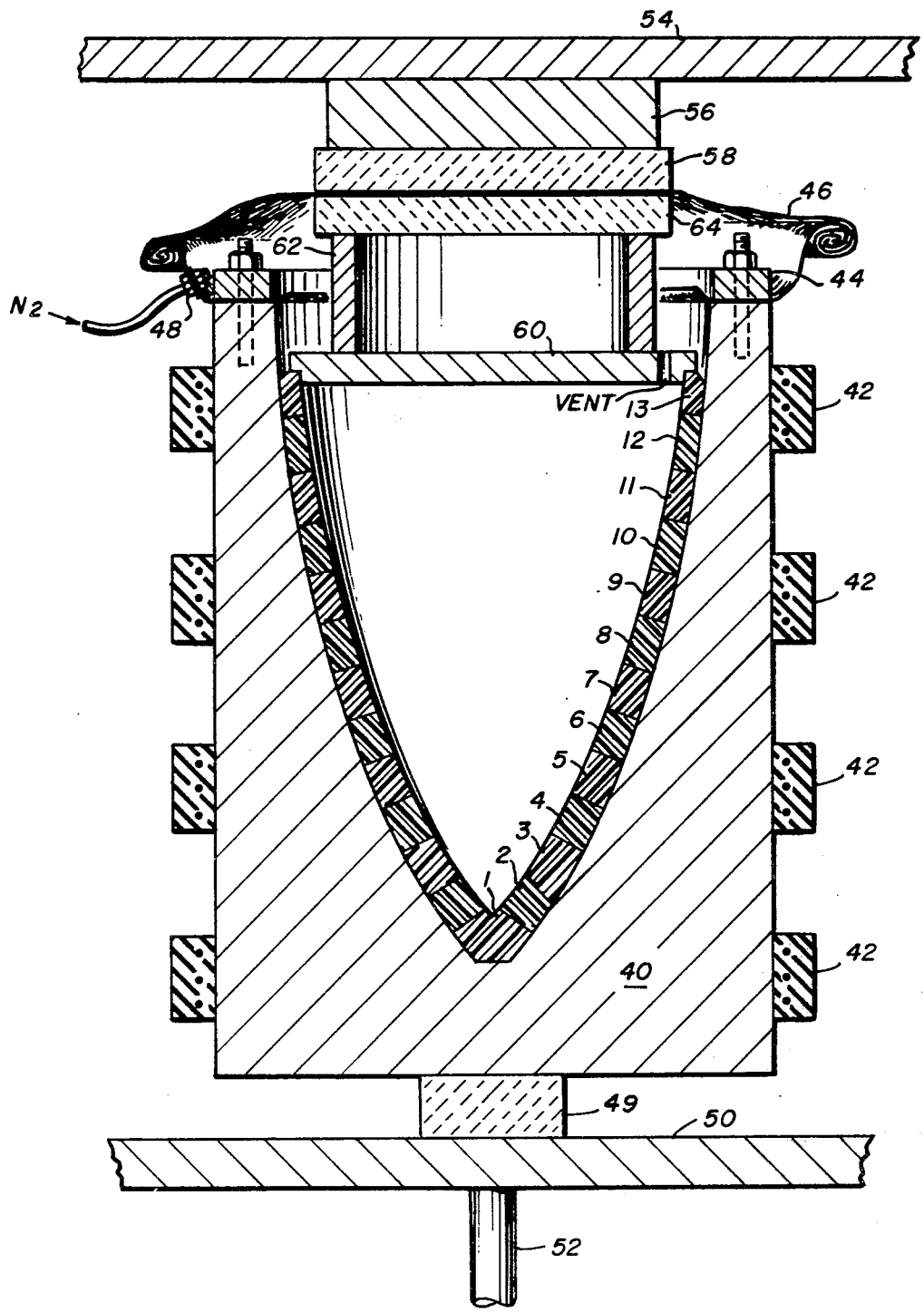
FIG. 2 is a schematic cross-sectional elevation view of a mold structure with segments assembled in the mold ready for sintering.
Figure 4:
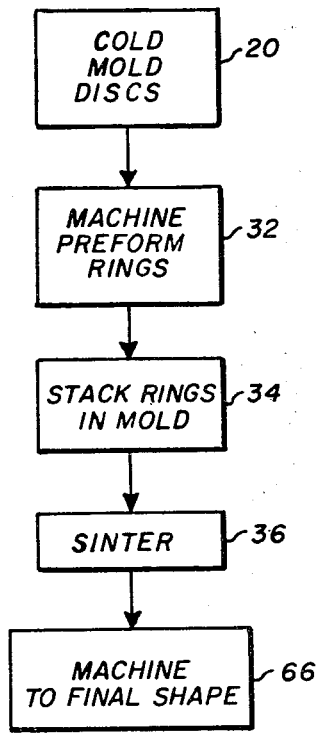
FIG. 4 is a flow diagram of the process of the present invention.

With reference now to the drawing, and particularly to FIGS. 1, 2 and 4, the first step 20 in the practice of the present invention comprises formation of a series of discs 22, 24, 26 and 28. These discs are comprised of from 95 to 50 parts by weight of PTFE; i.e., TEFLON 7A; and from 5 to 50 parts by weight of reinforcing fibers. The reinforcing fibers may be comprised of a ceramic material, microfiberglass or other similar materials. Thus, by way of example, the fibers may comprise Johns-Mannvill Company Type 104 E microfiberglass or "Fiberfrax" aluminum silicate fibers available from Carborundum Corporation. The fibers, which are inorganic, will typically range in diameter from 0.05 to 10 micrometers and will preferably have an aspect ratio of at least 30.

The powder from which the discs 22, 24, 26 and 28 are formed is preblended, screened to insure against lumps, are milled and cold molded. It is very important that the discs 22, 24, 26 and 28, and thus the preforms which are to be cut therefrom be characterized by uniform fiber dispersion and uniform density. This is achieved by compacting the powder in a cold molding step with the application of direct linear pressure. This manner of forming the discs results in the majority of the fibers assuming an orientation wherein they are generally perpendicular to the direction of molding compression.

As indicated at step 32 in FIG. 4, the discs are machined to obtain a series of preform rings 1–13 shaped as shown in FIG. 1. These preforms are numbered consecutively in the order in which they will be placed in a mold as will be described below in the discussion of FIG. 2. As will be described in greater detail below, the preforms are sized and shaped so that, when stacked in the mold, the abutting surfaces will be in intimate contact. Additionally, the angles at which these abutting preform surfaces are cut; i.e., the slopes of the end faces of the rings; are chosen such that these surfaces are generally perpendicular to the wall of the mold in which the preforms are stacked to form a generally conical configuration of radome shape. As indicated in FIG. 1, several rings can be machined from each of the cold molded discs. As may be seen from FIGS. 1 and 2, all of the preforms with the exception of the end segment 1 are annular. The end segment 1 is machined to conform to the shape of the bottom inner surface of the mold cavity in which the preforms are to be placed.

In one reduction to practice of the invention the preform rings 1–13 were lathe cut from the discs 22–28. This was accomplished by first facing off both sides of each disc with the second face being cut to a constant compound feed setting. Next, the first side of each disc was cut in such a manner that the cutting penetrated half-way through the thickness of the disc. Subsequently, cuts were made from the second side of each disc and deeply enough to get by the corners to subsequently be made by the beveled faces. During this second cutting procedure, sufficient material was left between the rings for support. Face angles were then cut on the first disc sides, starting at the outer edge of each ring, to form first beveled faces. Next, face cuts are preformed on the second sides, starting at the inner edge of each ring, to form the second beveled faces. Finally, cutting from the second side, the rings were parted. In summary, the second step 32 in the practice of the present invention comprises the machining of beveled sided, flat faced rings from cold molded discs of fiber reinforced PTFE molding compound. Although other machining techniques may be employed, lathe machining has been found to be a practical procedure for producing the preform rings from the molded billets 22, 24, 26 and 28.

Referring to FIG. 2, and as indicated at step 34 in FIG. 4, the machined preform rings are loaded into the cavity of a mold 40 as shown. In one reduction to practice of the invention mold 40 comprised a block of aluminum machined so as to have an inside contour which matched the final desired shape of a radome. The mold cavity was designed to allow for axial expansion and contraction of the molded part and also so as to allow for radial shrinkage. The preform rings are to be sintered into a unitary structure and, in order to avoid fissures or other thermally induced defects, means must be provided to uniformly heat mold 40. In the disclosed embodiment, the heating means comprises four resistance type heaters 42 in the form of bands wrapped around the exterior of mold 40. It has also been found necessary, in order to prevent air from attacking the polymer in the region of the interfaces between the rings, to provide for the hermetic sealing of the mold cavity with respect to the ambient environment. Accordingly, a clamping ring 44 is provided about the upper periphery of mold 40. Ring 44 is employed to clamp an edge of an aluminum foil envelope 46 to the upper side of mold 40. Envelope 46 is provided with a hose connector, as indicated at 48, whereby the interior of the envelope and mold may be coupled to a source of pure dry nitrogen.

In the embodiment being disclosed, the mold 40 is supported on a block of thermal insulating material 49 which, in turn, rests on a movable plate 50. Plate 50 is connected, via a push rod 52 to a hydraulic cylinder coupled to a controlled pressure source whereby axial pressure may be applied to the part being formed during the sintering operation. The push rod 52 and plate 50 urge mold 40 upwardly toward a fixed plate 54 from which, by means of a block 56, a further thermal insulator 58 is supported. During the loading of the mold cavity, prior to installation of aluminum foil envelope 46, a retainer assembly is installed in the mold cavity. This retainer assembly includes an aluminum pusher disc 60 which is supported on a ring 62 which extends downwardly from a further block of thermal insulating material 64. A portion of the foil envelope 46 is sandwiched between thermal insulating members 58 and 64. The pusher disc 60 is provided with an aperture 66, or a plurality of apertures, to permit nitrogen to flow to the interior of the mold cavity. Disc 60 is also provided with an annular cut-out which forms a shoulder extending about the lower periphery thereof. This shoulder engages the uppermost ring 13 as shown in FIG. 2. The disc 60 prevents the stack of preform rings from sagging inwardly during the sintering step and, in combination with the hydraulic cylinder, applies axial force to the stack.

After the mold has been loaded as indicated at step 36 in FIG. 4, the sintering cycle is begun. Simultaneously with energization of heaters 42, the flow of nitrogen is started. The air is diffused out of the mold cavity by maintaining nitrogen above disc 60. Restated, by the time the PTFE composite reaches a temperature above 300° C., where attack by oxygen could occur, all air will have been swept out of the mold by the nitrogen. In accordance with the present invention, a long sintering cycle is employed to achieve temperature uniformity during the melt phase, when the polymer is in the crystalline melt stage, and to permit slow squeeze flow to maintain material conformity to the mold shape during the thermal expansion which occurs as the material passes through the crystalline melt point. It is also to be noted that, as represented in FIG. 2, adequate mold cavity space above the preform ring stack is required so that, during peak expansion, the part being formed does not extend above the top surface of the mold and seal off the nitrogen flow which prevents air from entering the aluminum foil seal. Axial force is applied to the preform rings in the mold during the sintering step. This applied force is maintained by monitoring and controlling the pressure within the hydraulic cylinder connected to push rod 52. It has been found adequate to maintain the hydraulic pressure constant whereby, because of expansion and contraction of the work, the applied force will vary. The applied force causes the abutting beveled faces of the machined preform segments to maintain conformance and contact with one another through the various stages of the sintering cycle including especially the expansion during crystalline melt and the soaking period above the crystalline melt temperature.

As noted above, in accordance with the present invention a long sintering cycle is employed. An important characteristic of this sintering cycle is that the transition temperature of the polymer be passed through during a slow rise segment of the cycle. Through the use of suitable instrumentation, not shown, the heating may be programmed and subsequently controlled pursuant to a multistep schedule. In one reduction to practice, the preform rings were comprised of 85% by weight PTFE, 15% by weight microglass fibers having an average diameter of about 0.2 micrometers and an average length of about 2 millimeters and the rings ranged from 13 to 22 millimeters in thickness. The thickness was measured perpendicular to the mold walls and was a function of mold cavity diameter. Also during sintering, an axial force in the range of 3.35 to 4.13 kilonewtons was applied to mold 40. The sintering cycle for the example being described was controlled as follows:

| Hours from Start | 0 | 4 | 24 | 32 | 46 | 50 |
|---|---|---|---|---|---|---|
| Mold Temperature (°C.) | 23 | 275 | 370 | 370 | 275 | 100 |

It is to be noted that the rate of heating up through the melt point of the polymer; i.e., as the temperature rises from 275° C. to 370° C.; is of very long duration when compared to prior portion of the heating cycle. It is further to be noted that the maximum temperature, which occurs in the 24 to 32 hour period of the cycle, will be in the range of 380° to 395° C. which is well below the temperature at which decomposition of PTFE will begin. Bearing in mind that virgin PTFE has a melt point in the range of 333° to 338° C., the present invention contemplates a heat soak above the melt point for a long period of time to insure a thermal "knit" across the boundaries of the preform rings. This heat soak above the melt point will typically be of from 4 to 9 hours duration. The polymer is initially basically crystalline in form. When heated above the melt point, the polymer becomes a rubbery amorphous material and the polymer chains will, to some extent, diffuse across joints whereby the individual rings will, partly as a consequence of the applied axial pressure, join to form a unitary structure. It is also to be noted that when the polymer reaches melt point, it will expand dramatically but this expansion will occur, with a small temperature rise, over a long period of time. If the abutting side surfaces of the preform rings were not "beveled"; i.e., perpendicular to the wall of the mold cavity; slippage between rings would be likely to occur during this expansion.

It has been also found to be desirable to slowly cool the formed part to and through the recrystallization point, which will be in the range of from 315° to 320° C., in the interest of solidification of the entire part at the same time. This manner of cooling is in the interest of minimizing shrink stresses. The part will shrink more in the length direction than in the radial direction as a result of the above-described orientation of the fibers. However, there is sufficient radial shrinkage that the part will move away from the inner wall of the mold except, of course, at the very bottom. It is for this reason that the tip ring 1 is formed in such a manner that it will not bind with the mold cavity.

Figure 3:
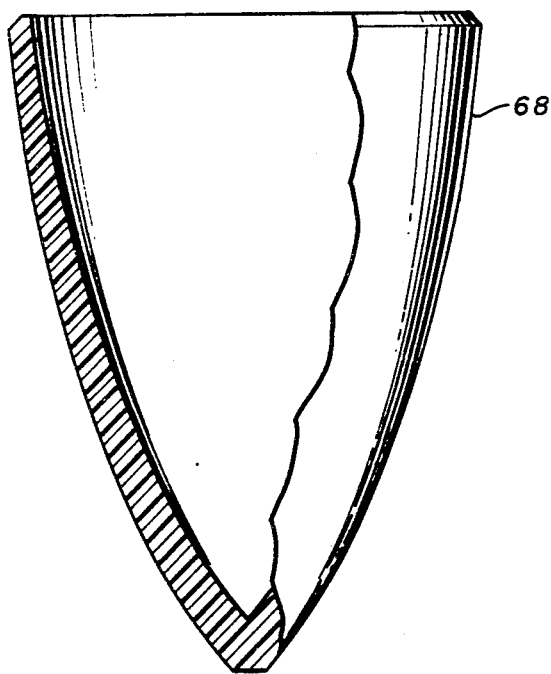
FIG. 3 shows a side elevation view, partly in section, of a finished radome.

Subsequent to cooling, the radome blank, or other part, will be removed from mold 40 and machined, as indicated at step 66 in FIG. 4, to the desired final shape as shown at 68 in FIG. 3.

While the above discussion has been limited to PTFE and fiber composites, other fluoropolymers may be added to the composites for the purpose of modifying the processing requirements for attaining certain desirable characteristics. Typically such additives will possess lower melting temperatures, lower melt viscosity, better ability to wet fiber or filler surfaces, and to close voids in preforms. Fluoropolymer additives that could be used include, but are not limited to copolymers of tetrafluoroethylene and hexafluoropropene. Also, Teflon PFA, a polymer with perfluoroalhoxy side groups, could be added to the fiber reinforced composites used in the practice of the present invention.

While a preferred embodiment has been shown and described, various substitutions and modifications may be made thereto without departing from the spirit and scope of the invention. Accordingly, it is to be understood that the present invention has been described by way of illustration and not limitation:

What is claimed is:

1. A method for the production of complex shapes from fiber reinforced polymeric material comprising the steps of:
    forming a mixture of polymeric material in powder form and reinforcing fibers;
    cold molding the mixture to form a fiber-polymer composite billet wherein the majority of the fibers are orientated in a desired direction ;
    machining preform segments of the complex shape from the billet, the segments being formed to have planar abutting surfaces;
    stacking the segments in a mold; and
    heating the mold while applying force to the segments to sinter the polymer composite and effect bonding between adjacent segments.

2. The method of claim 1 wherein the mold has a cavity with the desired complex shape and wherein the step of machining comprises:
    cutting each of the segments to have a first surface area which conforms to a portion of the mold cavity wall; and
    cutting the surfaces of the segments which are to abutt other segments such that such abutting surfaces will be generally perpendicular to the mold cavity wall portion to which the segment first surface area conforms.

3. The method of claim 2 wherein the polymeric material is a fluoropolymer and wherein the step of heating includes:

heating the mold at a first rate to a first temperature below the crystalline melt point of the polymer;

heating the mold at a second rate from said first temperature to a second temperature above the crystalline melt point of the polymer but below the decomposition temperature of the polymer, the temperature rise during heating at said second rate being slower than during heating at said first rate;

maintaining the mold temperature above the crystalline melt point of the polymer for a preselected time; and cooling the mold to room temperature.

4. The method of claim 3 wherein the complex shape is at least in part tubular and wherein at least some of the segments are in the general form of rings.

5. The method of claim 4 wherein the complex shape is a radome blank having an axis and the force applied is along said axis, the abutting surfaces of the segments being oriented at angles other than 90° with respect to said axis whereby said abutting surfaces cooperate to resist relative radial motion between adjacent segments.

6. The method of claim 5 wherein the step of cold molding includes the application of direct linear pressure to form a disc wherein the majority of fibers are perpendicular to the direction of molding compression of the disc.

7. The method of claim 6 wherein the step of forming the mixture comprises:

mixing from 95 to 50 parts by weight of polytetrafluoroethylene with from 5 to 50 parts by weight of inorganic microfibers.

8. The method of claim 7 wherein the abutting segment surfaces are in intimate contact and slope upwardly in the direction of said axis and wherein said segments are capable of axial movement and the uppermost segment is engaged by a support to prevent radial movement thereof.

9. The method of claim 1 further including the step of:

milling the sintered polymer composite segments to form the final complex shape.

* * * * *